United States Patent [19]

Willmann

[11] Patent Number: 5,188,437
[45] Date of Patent: Feb. 23, 1993

[54] BRAKE PRESSURE CONTROL APPARATUS FOR AN ALL WHEEL DRIVE VEHICLE HAVING ABS AND ASR

[75] Inventor: Karl-Heinz Willmann, Freiberg, Fed. Rep. of Germany

[73] Assignee: Robert Bosch GmbH, Stuttgart, Fed. Rep. of Germany

[21] Appl. No.: 842,918

[22] Filed: Feb. 27, 1992

[30] Foreign Application Priority Data

Apr. 4, 1991 [DE] Fed. Rep. of Germany ....... 4112759

[51] Int. Cl.⁵ ............................................. B60T 13/14
[52] U.S. Cl. ........................... 303/113.2; 303/DIG. 4; 303/116.2
[58] Field of Search .......... 303/113 TR, 111, 113 AP, 303/116 R, 116 SP, DIG. 2-DIG. 4, 113 TB; 364/426.01-426.03; 180/197

[56] References Cited

U.S. PATENT DOCUMENTS

| | | | |
|---|---|---|---|
| 4,796,959 | 1/1989 | Seibert et al. | 303/113 TR |
| 4,861,116 | 8/1989 | Bernhardt et al. | 303/113 TR X |
| 4,900,102 | 2/1990 | Jonner et al. | 303/116 R X |
| 4,900,105 | 2/1990 | Burgdorf et al. | 303/116 R |
| 4,971,400 | 11/1990 | Jonner | 303/116 R X |

FOREIGN PATENT DOCUMENTS

| | | | |
|---|---|---|---|
| 4001421 | 7/1991 | Fed. Rep. of Germany | 303/113 TR |
| 2195723 | 4/1988 | United Kingdom | 303/116 R |

Primary Examiner—Robert J. Oberleitner
Assistant Examiner—Alfred Muratori

[57] ABSTRACT

When ASR is running, the driver can brake at any time and does not encounter a stiff brake pedal. The ABS is equipped with an aspirating return pump which serves as a pressure producer in the ASR case with the aid of two auxiliary valves, i.e. a changeover valve and a loading valve. The brake pressure on the wheel on a selected axle that first shows a tendency to slip is modulated by way of the auxiliary valves, while the brake pressure on all other wheels is modulated by the ABS valves. In this manner brake pressure can always reach at least one wheel brake. If the ABS responds, the ASR is shut off.

4 Claims, 3 Drawing Sheets

BRAKE PRESSURE CONTROL APPARATUS FOR AN ALL WHEEL DRIVE VEHICLE HAVING ABS AND ASR

BACKGROUND OF THE INVENTION

The invention relates to brake pressure control apparatus for an all wheel drive vehicle having two brake circuits, each controlling two wheels and including ABS and ASR. Each circuit includes inlet and outlet valves at each wheel for increasing and decreasing brake pressure, a self priming pump for returning brake fluid released by the outlet valve, a changeover valve between the master cylinder and the point where the fluid is returned by the pump, a check valve in parallel with the changeover valve, and a loading valve connected between the inlet of the pump and a point between the master cylinder and the changeover valve.

In prior art apparatus of this type the brake pressure modulation in the event of anti-slip control action is performed by means of the anti-lock system valves; during the anti-slip control the changeover valve is not open and the loading valve is open. If the driver wishes to brake while anti-slip control is running it can happen that, since all of the inlet valves for the pressure modulation are closed, he finds he has a hard brake pedal and achieves no braking action. As a remedy for this, the brake light switch signal is used to shut off the anti-slip control.

SUMMARY OF THE INVENTION

According to the invention, the system is controlled so that in case of ASR the brake pressure at the wheel with the highest brake pressure on at least one axle is controlled by the changeover valve and the loading valve in the circuit controlling that wheel. The brake pressure of at least one other wheel is modulated by the outlet valve means. In case of control by ABS, the ASR is shut off.

The driver can brake even during anti-slip operation. This is accomplished through the one feedback valve by which the brake fluid volume can be shifted wheelward. Depending on which axle has been selected for the different modulation, pressure can be fed at least through the corresponding check valve. Preferably, the brake light switch signal is additionally used to shut off the anti-slip system. If the latter, however, has failed, then first at least one wheel, namely the one with the higher pressure and running at low friction, is braked. On account of the low friction, this wheel will immediately become unstable due to the brake pressure and the destabilization of the wheel is then also used in order to turn off the anti-slip control.

Thus, in case the brake light switch signal is additionally utilized, a redundant possibility is achieved for the effective action of the brakes.

DETAILED DESCRIPTION OF THE PREFERRED EMBODIMENT

Figure 1:
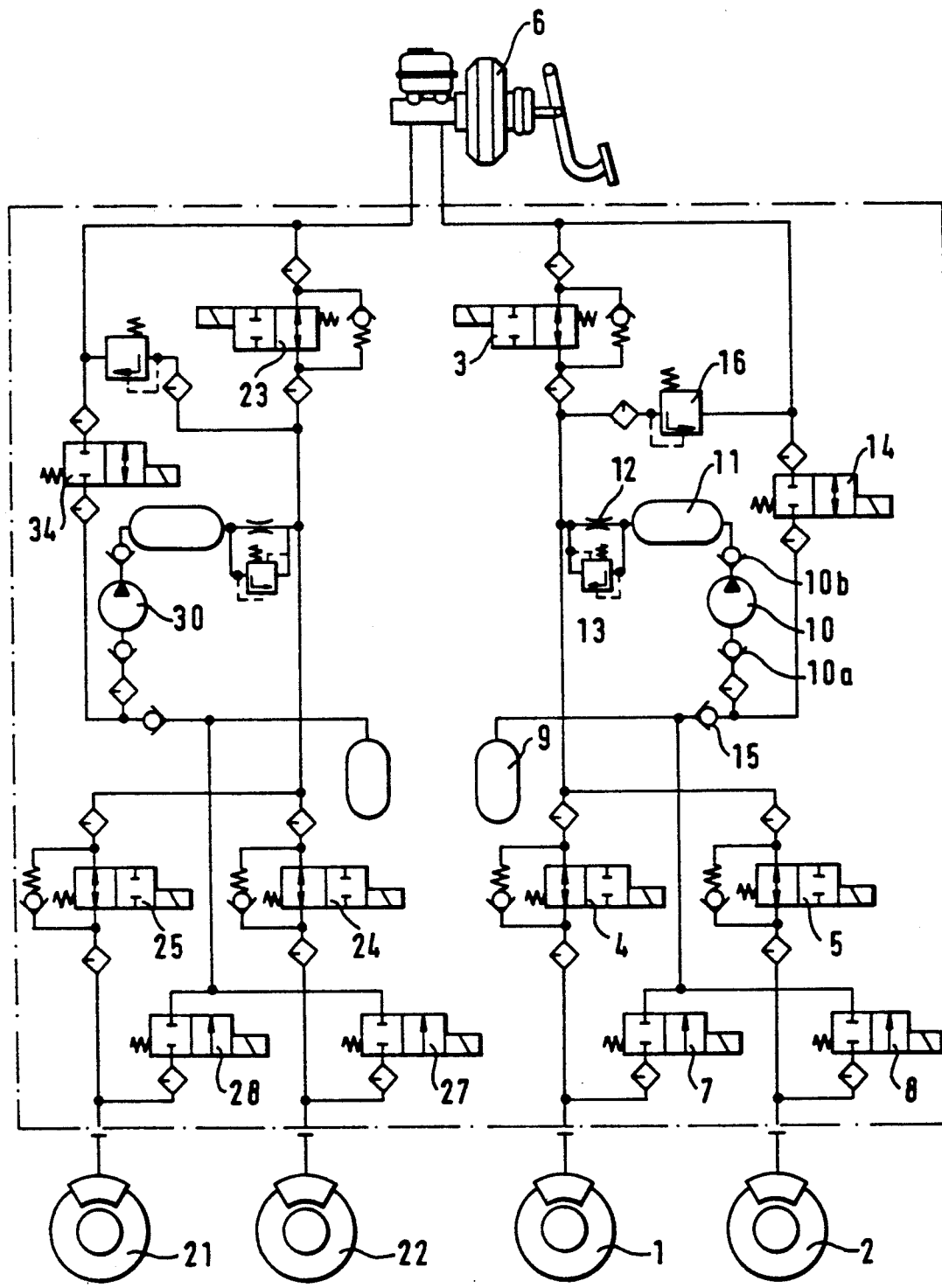
FIG. 1 is a hydraulic circuit diagram in which the brakes of each axle belong to a brake circuit.

In FIG. 1 the brakes of the front wheels 1 and 2 are connected to the one master brake cylinder of the brake unit 6 through a changeover valve 3 and ABS inlet valves 4 and 5. Outlet valves 7 and 8 are associated with the two inlet valves 4 and 5, and in case of anti-lock action they release pressure temporarily to a reserve chamber 9. A self-priming return pump 10 with a check valve 10a ahead of the inlet and a check valve 10b and following the outlet, which runs in the ABS event, pumps fluid back to the brake circuit through a pressure chamber 11 and a constriction 12. A pressure limiting valve 13 is shunted around the constriction 12.

For the anti-slip control the changeover valve 3 is provided, and a loading valve 14 which is inserted into a connection between the master cylinder (at 6) and the pump suction. A check valve separates this line from the reservoir 9. A connection with a pressure limiting valve 16 is provided between valves 3 and 14.

The hydraulic circuit associated with the rear wheels 21 and 22 and connected with the second master cylinder of the brake unit 6 is constructed in entirely the same manner.

In the ASR event, valves 23 and 34 change about, pump 30 starts up and produces brake pressure, and the ABS valves 24 and 25 and 27 and 28 regulate the pressure at the wheel brakes in accordance with the wheels' behavior.

If wheel 1 of the two front wheels first shows a tendency to slip, valves 3 and 14 are also changed about and pump 10 starts. The brake pressure at the brake of wheel 1, however, is not modulated by valves 4 and 7 but by the operation of valves 3 and 14, valves 3 and 14 relieving pressure in the position drawn, build it up in their other position and in the combination of valve 14 in the drawn position and valve 3 in the other position they keep the pressure constant. If a tendency to slip also occurs at wheel 2, the brake pressure at this wheel is modulated by valves 5 and 8, in which case valves 3 and 14 must be in the position not shown for the build-up of pressure. If the raising of the brake pressure at wheel 2 and the modulation of the brake pressure at wheel 1 require different positions of valves 3 and 14, the wheels are served successively according to established priority rules, e.g., the wheel first showing the tendency to slip will be served ahead of the other wheel.

During the anti-slip control operation an estimate is made on the basis of the pressure build-up and build-down times as to which front wheel has the higher brake pressure. In the wheel with the higher brake pressure the pressure at the brake is modulated by valves 3 and 14, and in the wheel with the lower pressure by valves 4 and 7 or 5 and 8, respectively. This can change frequently during the operation of the control.

It would be easily possible to modulate the rear wheels 21 and 22 like wheels 1 and 2, and vice-versa.

Figure 2:
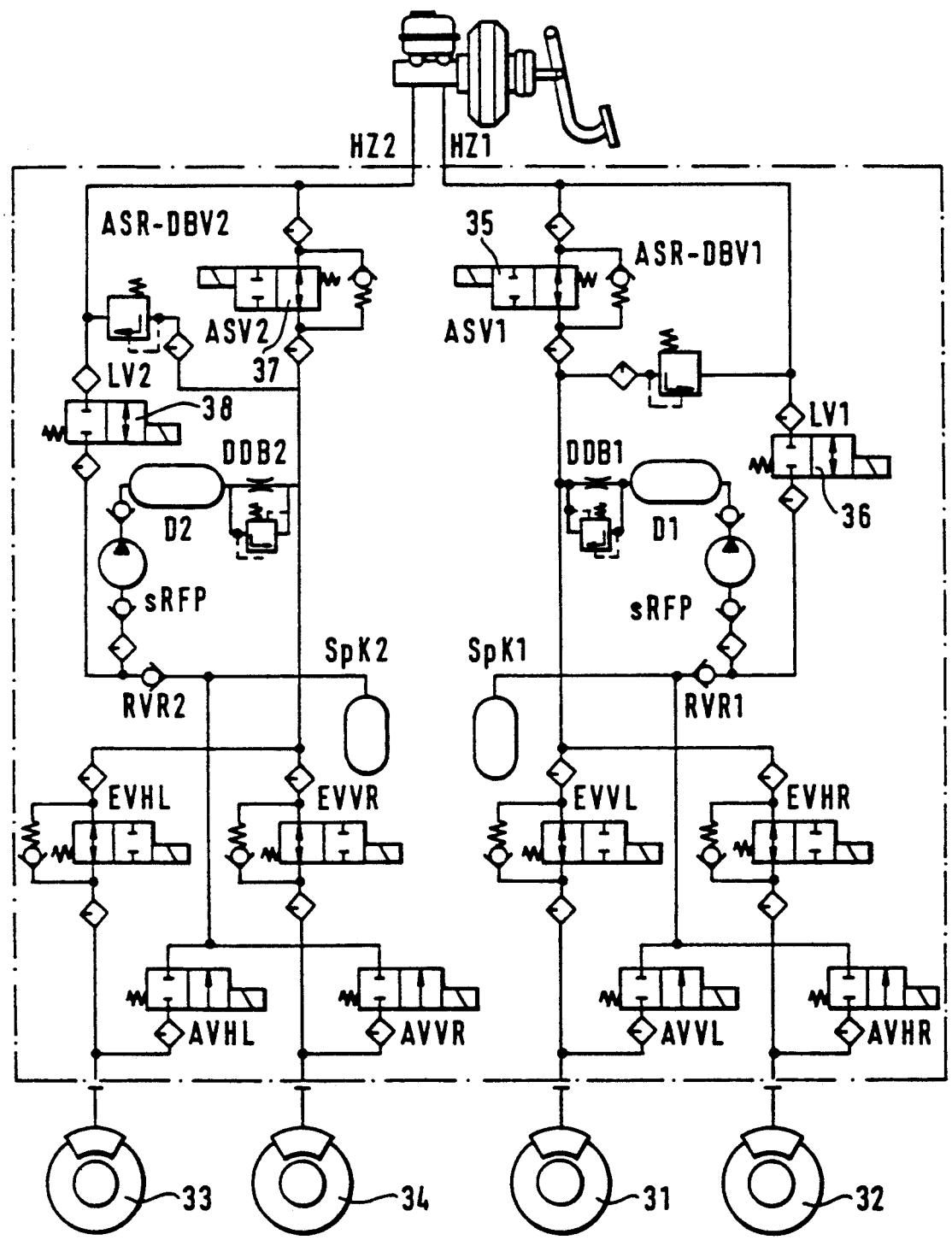
FIG. 2 is a hydraulic circuit diagram with a diagonal relationship to a brake circuit.

FIG. 2 differs from FIG. 1 in that the brakes of diagonally located wheels 31 and 32 pertain to one brake circuit and wheels 33 and 34 to the other. Here again the brake pressure of the wheel showing the higher brake pressure on a selected axle (e.g., the rear axle with wheels 31 and 34) is modulated by a changeover valve and a charging valve, either with valves 35 and 36 or with valves 37 and 38.

Figure 3:
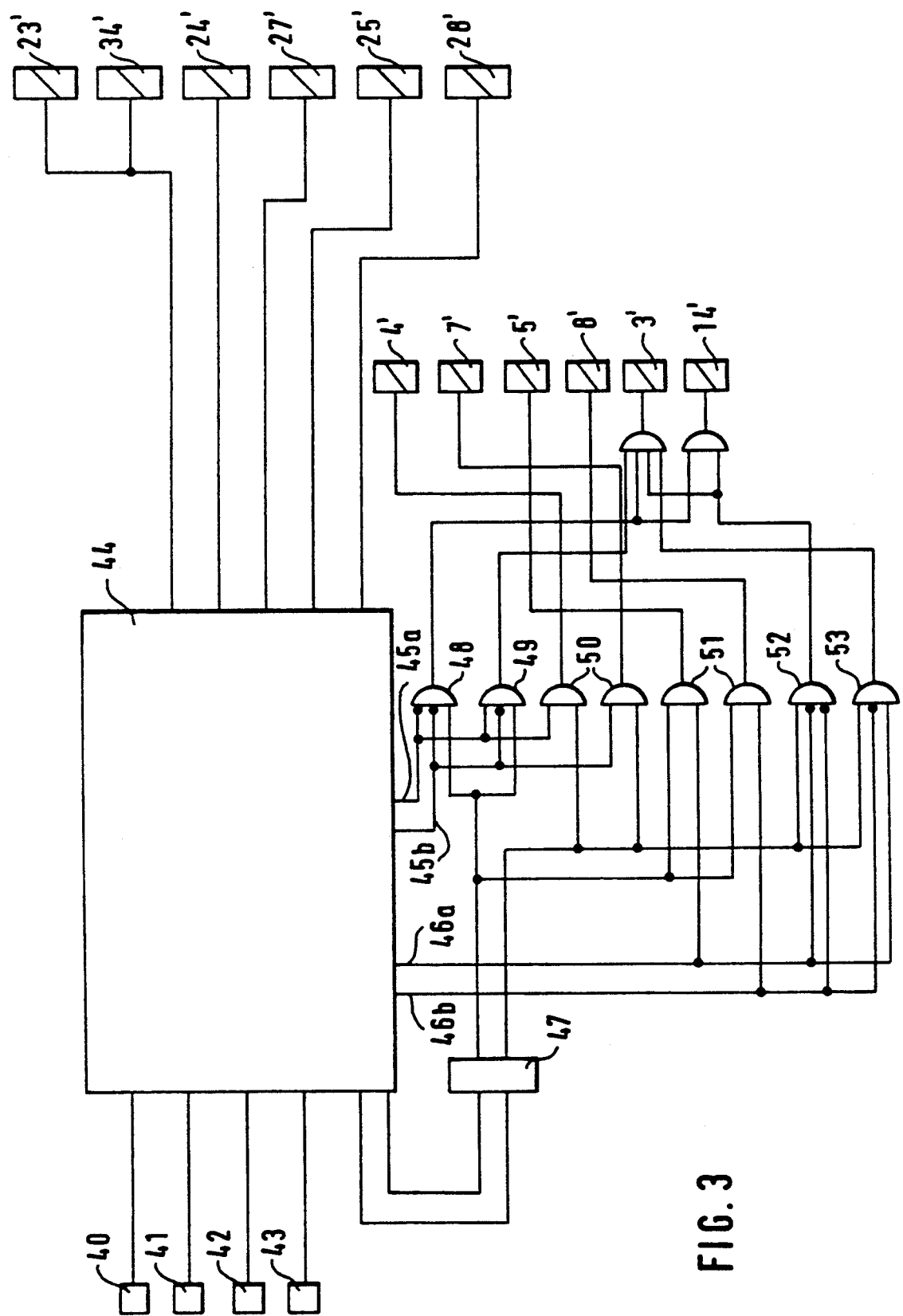
FIG. 3 is a block circuit diagram of a control apparatus.

FIG. 3 shows an actuating circuit for the twelve valves of FIG. 1 or 2 in the ASR case. The actuating lines for the ABS case for the six lower valves have been omitted from the drawing for the sake of clarity.

Wheel speed sensors 40 to 43 are associated with the four wheels. Sensors 42 and 43 are associated with the front wheels.

The signals from sensors 40 to 43 are fed to a control apparatus 44 which is to be both an ABS and an ASR control apparatus. Here we are concerned only with the ASR control part of the apparatus. The twelve valves of FIG. 1, however, are provided with the same reference numbers as in FIG. 1, but are primed.

In FIG. 3 it is assumed that the front axle is the selected axle, i.e., modulation is performed on the brakes of its wheels by different means. In the case of ASR at the rear axle, valves 23' and 34' are activated for the entire ASR phase; also the return pump is turned on and the brake pressure is modulated with the inlet valves 24' and 25' and outlet valves 27' and 28'.

On the front axle the ASR is handled differently. It is assumed that one of the lines 45a or 46a carries a signal if pressure at one wheel brake is to be kept constant, that the line pairs 45a/45b or 46a/46b carry a signal if pressure is to be relieved, and the line pairs have no signal if pressure is to be built (as is the case of the line pairs inlet/outlet valves 24'/27' or 25'/28'.

A block 47 determines which wheel has the higher pressure and puts out a signal on its upper output line whenever a tendency to slip is first detected by the sensor 42. This signal brings it about that, on the one hand, AND gate 51 is prepared to send modulation signals on lines 46a and 46b to the inlet valve 5' and the outlet valve 8' respectively, that furthermore an output signal develops at an AND gate 48 if neither of lines 45a and 45b is carrying a signal (pressure build-up is desired), and that lastly an AND gate 49 emits a signal if line 45a is carrying a signal and line 45b is not (maintain pressure). The output signal of the AND gate 48 is fed to the valves 3' and 14', causing the pressure build-up to actually occur (pump 10 is started). An output signal of the AND gate 49 actuates only valve 3', so that pressure is held steady. If there is no deactivating signal for valves 3' and 14', then pressure is relieved.

If the lower output line of block 47 carries a signal, then valves 4' and 7' modulate the pressures at the wheel with which sensor 42 is associated, and the pressure at the other wheel is modulated by means of valves 3' and 14'.

In any case, at least one of inlet valves 4' and 5' is always open, so that the corresponding wheel can be given brake pressure. If it becomes unstable, ABS starts, causing ASR to be shut off internally in block 44.

I claim:

1. Brake pressure control apparatus for an all-wheel drive vehicle having two axles, two wheels on each axle, and two brake circuits including ABS and ASR, each circuit depending on a master cylinder and controlling two wheels, said apparatus comprising inlet valve means for each wheel for admitting brake fluid at each wheel to increase brake pressure at said wheel, outlet valve means for each wheel for releasing brake fluid at each wheel to decrease brake pressure in case of ABS, a self priming pump in each circuit for returning brake fluid released by said outlet valve means to a point in said circuit, said pump having an inlet connected to said outlet valve means and an outlet connected to said point in said circuit, a changeover valve in each circuit between the master cylinder and the point where brake fluid is returned by the pump, said changeover valve being closed in case of ASR, a check valve in parallel with each changeover valve, said check valve opening in the direction of the point where fluid is returned, a loading valve in each circuit connected between the input of the pump and a point in the circuit between the master cylinder and the changeover valve, said loading valve being open in case of ASR, means for determining which wheel has the highest brake pressure, and a control circuit for controlling said inlet valve means, said outlet valve means, said pumps, said changeover valves, and said loading valves so that in case of ASR, the brake pressure at the wheel with the highest brake pressure on at least one axle is modulated by the changeover valve and the loading valve in the circuit controlling that wheel and the brake pressure of at least one other wheel is modulated by the outlet valve means, and so that in case of control by ABS, the ASR is shut off.

2. Brake pressure control apparatus according to claim 1, wherein the wheels of one axle are associated with each brake circuit.

3. Brake pressure control apparatus according to claim 1, Wherein the wheels of one diagonal are associated with each brake circuit.

4. Brake pressure control apparatus according to claim 1 wherein the said vehicle further comprises a brake light switch which generates a signal when the vehicle is braked manually, said control circuit shutting-off ASR when the brakelight switch signal is generated.

* * * * *

UNITED STATES PATENT AND TRADEMARK OFFICE
CERTIFICATE OF CORRECTION

PATENT NO. : 5,188,437
DATED : February 23, 1993
INVENTOR(S) : Willmann

It is certified that error appears in the above-indentified patent and that said Letters Patent is hereby corrected as shown below:

Cover page, [30] :   "Apr. 4, 1991 [DE]" should read
                    --Apr. 19, 1991 [DE]--.

Signed and Sealed this

Twenty-fourth Day of January, 1995

Attest:

BRUCE LEHMAN

Attesting Officer

Commissioner of Patents and Trademarks